(12) United States Patent
Flaherty

(10) Patent No.: US 9,206,318 B2
(45) Date of Patent: Dec. 8, 2015

(54) COMPOSTABLE AND BIODEGRADABLE MATERIALS AND ARTICLES FORMED FROM THEM

(75) Inventor: Michael John Flaherty, Warrington (GB)

(73) Assignee: Michael John Flaherty, Warrington (GB)

( * ) Notice: Subject to any disclaimer, the term of this patent is extended or adjusted under 35 U.S.C. 154(b) by 0 days.

(21) Appl. No.: 14/236,328

(22) PCT Filed: Aug. 3, 2012

(86) PCT No.: PCT/GB2012/051891
§ 371 (c)(1),
(2), (4) Date: Jan. 30, 2014

(87) PCT Pub. No.: WO2013/017895
PCT Pub. Date: Feb. 7, 2013

(65) Prior Publication Data
US 2014/0187665 A1    Jul. 3, 2014

(30) Foreign Application Priority Data

Aug. 4, 2011  (GB) .................................. 1113415.2

(51) Int. Cl.
| | | |
|---|---|---|
| *C08L 97/02* | (2006.01) | |
| *C08J 5/04* | (2006.01) | |
| *C08L 1/02* | (2006.01) | |
| *C08J 9/00* | (2006.01) | |
| *C08L 3/02* | (2006.01) | |
| *C08L 67/04* | (2006.01) | |
| *C08B 31/00* | (2006.01) | |
| *C08B 31/04* | (2006.01) | |
| *C08L 3/04* | (2006.01) | |
| *C08K 3/34* | (2006.01) | |
| *C08K 9/04* | (2006.01) | |

(52) U.S. Cl.
CPC ............... *C08L 97/02* (2013.01); *C08B 31/006* (2013.01); *C08B 31/04* (2013.01); *C08J 5/045* (2013.01); *C08J 9/0014* (2013.01); *C08J 9/0061* (2013.01); *C08L 1/02* (2013.01); *C08L 3/02* (2013.01); *C08L 3/04* (2013.01); *C08L 67/04* (2013.01); *C08J 2303/02* (2013.01); *C08J 2367/04* (2013.01); *C08J 2397/02* (2013.01); *C08K 3/346* (2013.01); *C08K 9/04* (2013.01)

(58) Field of Classification Search
CPC ........... C08L 1/02; C08L 67/04; C08L 67/02; C08K 9/04; C08K 3/346; C08K 3/0033; C08J 5/045; C08J 2367/04; C08J 2303/04
USPC ......................................... 523/100, 128, 200
See application file for complete search history.

(56) References Cited

U.S. PATENT DOCUMENTS

| | | | |
|---|---|---|---|
| 6,455,691 B1 | 9/2002 | Hlynianski | |
| 2006/0235113 A1* | 10/2006 | Dorgan et al. | ................... 524/13 |
| 2008/0153940 A1 | 6/2008 | Scheer et al. | |
| 2009/0274920 A1* | 11/2009 | Li et al. | ......................... 428/481 |
| 2012/0196950 A1* | 8/2012 | Weismann et al. | ............ 523/100 |

FOREIGN PATENT DOCUMENTS

| | | |
|---|---|---|
| EP | 0946597 B1 | 8/2003 |
| GB | 2444913 A | 6/2008 |
| JP | 2004352844 A | 12/2004 |
| WO | 03059756 A2 | 7/2003 |
| WO | 2007050560 A2 | 5/2007 |
| WO | 2007120164 A1 | 10/2007 |
| WO | 2011085332 A1 | 7/2011 |

OTHER PUBLICATIONS

Patent Cooperation Treaty, International Preliminary Report on Patentability and Written Opinion of the International Searching Authority for PCT/GB2012/051891 dated Feb. 4, 2014, 7 pages.
Patent Cooperation Treaty, International Search Report and Written Opinion for PCT/GB2012/051891 dated Nov. 9, 2012, 11 pages.

* cited by examiner

*Primary Examiner* — Tae H Yoon
(74) *Attorney, Agent, or Firm* — Hoffman Warnick LLC

(57) ABSTRACT

A material comprising a biopolymer blend including a crosslinked mixture of polylactic acid (PLA) and a polysaccharide, blended with particles of $CaCO_3$ that have been coated with a fatty acid compound; particles of mica; and a cellulose filler; products made from said material; and methods of manufacturing said material and said products.

14 Claims, No Drawings

COMPOSTABLE AND BIODEGRADABLE MATERIALS AND ARTICLES FORMED FROM THEM

This invention relates to compostable and biodegradable materials and articles formed from them. In particular, it relates to compostable and biodegradable materials that have multiple applications, that can be made from largely or entirely sustainable raw materials, and which can be formed using techniques including injection moulding.

Manufacturers of products from plastic materials have to meet an ever-increasing range of requirements that aim to limit the environmental impact of their products. Included in these requirements is for biodegradability and compostability of the material at the end of its useful life. There is also an increasing preference for materials that are manufactured from sustainable sources, and a corresponding move away from petrochemical-based polymers. A manufacturer may only use a plastic material that is sufficiently durable and resistant to degradation to ensure that a product made from it can perform as required during its useful life. It will be seen that, to some extent, the way that a material must behave at the end of its life is in conflict with the way it must behave during its useful life. For instance, good chemical stability is desirable when a material is within a working product, but is undesirable once it has become waste since it may result in a decrease in the biodegradability of the product.

One major application of plastic materials that will often be disposed of after a relatively short lifetime is in packaging of food products for retail distribution. Materials in which food products are packaged must meet stringent requirements relating, amongst other things, to their lack of toxicity, chemical stability, mechanical strength, and their ability to control the passage of gas, moisture and fats into and out of the package. On the other hand, it is highly desirable that the packaging will decompose rapidly once it has been discarded as refuse.

Likewise, other applications present a tension between durability and biodegradability. Items such as automotive components must have a long life, and resist degradation until the end of the life of a vehicle in which they are installed—a period of a decade or more. The present inventor addressed some of these problems with the food container disclosed in GB-A-2 444 913. While this addressed some of the environmental shortcomings of conventional products, use of a synthetic polymer lining could not be avoided altogether if the required resistance to high and low pH contents were to be achieved.

An aim of this invention is to provide a biodegradable and compostable packaging material that overcomes or at least ameliorates the environmental disadvantages of known products while achieving a high level of performance as a material for the production of a wide range of articles.

To this end, this invention provides a material comprising a biopolymer blend including a crosslinked mixture of polylactic acid (PLA) and a polysaccharide, blended with particles of $CaCO_3$ that have been coated with a fatty acid compound, particles of mica, and a cellulose filler.

The biopolymer blend may comprise from 40 to 60% by weight of PLA. The biopolymer blend may comprise from 40 to 60% by weight of polysaccharide. In some embodiments the biopolymer blend comprises approximately 50% by weight of PLA and approximately 50% by weight of polysaccharide.

The material may comprise a minimum of 32% by weight of the biopolymer blend. The material may comprise a maximum of 68% by weight.

In some embodiments the material comprises from 40 to 60% by weight of the biopolymer blend.

Crosslinking of the polysaccharide biopolymer and PLA creates a longer carbon chain greater than is present in PLA or polysaccharide alone. The polysaccharide may be a starch. One preferred form of starch is a chemically reactive starch as disclosed in EP-A-0 946 597, the contents of which are incorporated into this specification by reference. The use of this material has been found to promote biological decomposition of the material.

The cellulose filler may be wood flour. The material may comprise a maximum of 68% by weight of cellulose filler. The material may comprise a minimum of 32% by weight of cellulose filler.

In some embodiments the material comprises from 40 to 60% by weight of the cellulose filler The mica is preferably a modified mica. Suitably the mica is modified by mixing with kaolin clay. The mica is preferably mixed with kaolin clay, typically in a ratio of approximately 91% to 9% by weight. This improves the ability of the material to be subject to shear deformation, as occurs during injection moulding.

The material may comprise at least 1% by weight of mica, for example at least 4% by weight.

The material may comprise up to 20% by weight of mica, for example up to 15% by weight.

In some embodiments the mica provides the material with improved resistance to chemicals, abrasion and UV light. The addition of mica may improve the tensile strength and the flexural modulus of the material.

The material comprises particles of $CaCO_3$ that have been coated with a fatty acid compound. The fatty acid coating is typically from 0.1 to 5% by weight, for example approximately 1% of the $CaCO_3$ by weight. Suitable fatty acid compounds include free fatty acids and salts and esters thereof. Preferred fatty acid compounds are stearate compounds. Suitable stearate compounds include stearic acid and stearic acid salts. Suitable stearic acid salts include alkalia metal, alkali earth metal and ammonium salts, for example calcium stearate. Preferably the majority of the particles of $CaCO_3$ have a size less than several μm and the stearate coating accounts for from 0.5 to 2.5% by weight, preferably approximately 1% by weight. Preferably 60% of the particles of $CaCO_3$ have a particle size of less than 2 μm.

The material may comprise at least 1% by weight of the particles of $CaCO_3$ that have been coated with a fatty acid compound, for example at least 4% by weight.

The material may comprise at up to 20% by weight of the particles of $CaCO_3$ that have been coated with a fatty acid compound, for example up to 15% by weight.

The particles of $CaCO_3$ that have been coated with a fatty acid compound provide the material with improved barrier properties with regard to moisture, oil, fats and gases.

In embodiments of the invention, the polymer blend is most typically of minimum 32% by weight, and the cellulose filler is typically of maximum 68% by weight.

Within the polymer blend, the PLA and the polysaccharide are most usually approximately each 50% by weight.

The material may comprise a plasticiser. Suitable plasticisers include bioplasticisers, for example the products sold under the trade mark Biostrength.

In some embodiments the plasticiser improves the tensile strength and the impact performance of the material.

In some embodiments the plasticiser is a low temperature plasticiser. A suitable low temperature plasticiser is dioctyl adipate.

The addition of dioctyl adipate to the material of the present invention improves the elasticity and tensile strength of the material at low temperatures, for example at −40° C.

The material may comprise at least 1% by weight of the plasticiser, for example at least 5% by weight.

The material may comprise up to 20% by weight of the plasticiser, for example up to 15% by weight.

The material may comprise slate particles. Suitably the slate particles have been ground and passed through a 40 mesh standard sieve.

The material may comprise at least 1% by weight of the slate particles, for example at least 5% by weight.

The material may comprise up to 20% by weight of the slate particles, for example up to 15% by weight.

In some embodiments the slate particles provide the material with improved tensile strength and impact resistance. Slate particles are classified as an organic waste material.

Preferably the material of the first aspect has a melting point lower than 240° C. Preferably it has a melting point in the range of 150 to 220° C. Preferably the melting point of the material is. The melting point of the material is preferably lower than the melting point of typical fossil fuel derived polymer materials. A lower melting point means that less energy is required to process the material into a desired shape compared with a typical fossil fuel derived polymer material.

From a second aspect, this invention provides a product, such as a packaging product, that is formed from a material embodying the first aspect of the invention.

The material of the first aspect may be used to make a product of the second aspect that would typically be made from a fossil fuel derived polymer, for example polypropylene (PP), polyethylene terephthalate (PET), polystyrene (PS), high density polyethylene (HDPE) and low density polyethylene (LDPE).

Suitable forms of product include disposable packaging, disposable utensils, horticultural devices and sapling tree protectors, hot beverage cup disposable lids, moulded panels for the automotive industry, moulded knives forks and spoons, picnic ware, moulded spectacle frames, mobile phones and computer shells, golf club tags, hotel key cards and ball point pen barrels.

Such products may be formed by injection moulding.

According to a third aspect of the present invention there is provided a method of producing a material comprising the steps of:
(a) forming a biopolymer blend from a mixture comprising polylactic acid (PLA) and a polysaccharide;
(b) admixing the biopolymer blend with particles of $CaCO_3$ that have been coated with a fatty acid compound, particles of mica, and a cellulose filler;
(c) optionally admixing the mixture obtained following step (b) with additional ingredients; and
(d) forming the mixture obtained following steps (b) and (c) into a coherent mass.

Preferred features of the third aspect are as defined in relation to the first aspect.

The ingredients referred to in step (b) may be pre-dried prior to admixing with the biopolymer blend.

Suitable additional ingredients for use in step (c) include slate particles and plasticisers.

Step (d) involves forming the mixture obtained following step (b) or when present step (c) into a coherent mass. By coherent mass we mean that the mixture has been formed into a bulk material, preferably a single mass of bulk material or a plurality of masses of bulk material, not a flowing particulate form.

Step (d) may involve compounding and/or extruding the mixture. Other methods of processing polymeric materials will be known to the person skilled in the art.

Step (d) may involve using a twin screw or single screw compounder from which the material may be extruded as pellets. The temperatures used at the wet-end of the compounder may be significantly lower than those used to process fossil fuel derived polymer materials, for example the temperature at the wet-end of the compounder may be approximately 190° C.

The variable temperatures along the length of the screws leading to the diehead of the compounder may be significantly lower than those used to process fossil fuel derived polymer materials. For example the feed throat may be at approximately 45° C., the feed temperature may be at approximately 180° C., the compression sector may be at approximately 168° C., the metering section may be at approximately 180° C. and the adaptor may be at approximately 180° C.

The temperature at the diehead of the compounder may be significantly lower than that used to produce fossil fuel derived polymer materials, for example approximately 190° C.

The revolutions of the screws may be similar to those used for fossil fuel derived polymer materials, for example from 50 to 150 rpm.

The production settings may be similar to those used for fossil fuel derived polymer materials, for example the L/D ratio may be from 24:1 to 32:1 and the compression ratio may be from 2.5:1 to 3:1.

After step (d) the material may be provided in pellet form.

Step (d) may be carried out using standard extrusion machinery to manufacture pellets.

According to a fourth aspect of the present invention there is provided a method of manufacturing a product, the method comprising the steps of producing a material according to steps (a) to (d) of the method of the third aspect and a step (e) of forming the coherent mass produced in step (d) into a product.

Step (e) may involve thermoforming the material into a shape. For example step (e) may be carried out using standard thermoforming equipment. The thermoforming may provide the material in the form of a packaging product.

Step (e) may involve vacuum forming the material into a shape.

The temperatures required to melt the material, prior to vacuum forming or thermoforming may be lower than the temperature required to melt typical fossil fuel derived polymer materials, for example from 220° C. to 170° C. It will be appreciated that this may save on energy use of the forming step.

Step (e) may involve injection moulding or blow moulding the material into a shape. For example step (e) may be carried out using standard injection moulding or blow moulding equipment.

Step (e) may involve foaming the material with the use of low shear extrusion methods. For example step (e) may be carried out using standard extrusion equipment for foaming polymers.

The material may be foamed in step (e) using a blowing agent. Suitable blowing agents include pentane, butane and $CO_2$.

By using $CO_2$ instead of standard blowing agents such as pentane and butane the volume of blowing agent required to produce a foamed polymer product may be reduced by approximately 50%. Without wishing to be bound by theory, it is believed that the $CO_2$ undergoes a reaction with plant based polymers to produce an expanded polymer with an even dispersal of uniform gas bubbles. A product produced by this method may have comparable mechanical and barrier properties of typical expanded polystyrene film with a thickness of from 0.5 mm to 5 mm.

Waste material produced during the production of the product of the present invention, for example during step (e) of the method of the third aspect, may be reworked with the material produced in step (d) or disposed of in compost waste streams for anaerobic digestion. For example the waste material produced during step (e) may be added to the blended mixture in step (d).

The product provided by step (e) may have any of the features described with respect to the product of the second aspect.

Preferably the material and or the product of the present invention is stored in dry and cool conditions.

An embodiment of the invention will now be described in detail, by way of example.

The constituents of this embodiment are set forth, in summary, in Table 1, below.

TABLE 1

| Polymer blend | 40% by weight |
| Surface-treated $CaCO_3$ powder | 5% by weight |
| Modified mica | 6% by weight |
| Wood flour 40 mesh | 49% by weight |

Each of these ingredients and the method of manufacture of the material will now be discussed in greater detail.

The Polymer Blend

The polymer blend comprises 50% injection moulding grade polylactic acid (PLA) pellets and 50% polysaccharide polymer.

The PLA chosen for this example is Ingeo 3801X supplied by NatureWorks LLC. A summary of the properties of this material is set forth in Table 2, such that other materials with similar properties may be substituted for it.

TABLE 2

| Specific Gravity | $1.33 \times 10^3$ kg/m³ |
| Viscosity Measurement | 3.10 |
| Linear Mould Shrinkage | 0.011-0.013 |
| Melt Flow (Load 2.16 kg, Temperature 190° C.) | 8.00 g/10 min |
| Tensile Strength, Yield | 25.9 MPa |
| Elongation at Break | 8.10% |
| Melting Point | 160-170° C. |
| Deflection Temperature at 0.46 MPa | 65.0° C. |
| Glass transition temperature | 45.0° C. |
| Feed temperature | 177° C. |
| Nozzle temperature | 188° C. |
| Melt temperature | 188° C. |
| Mould temperature | 85.0-105° C. |
| Injection speed | 50.8-203 mm/s |
| Screw Speed | 125 rpm |

The polysaccharide polymer is a polysaccharide that has been modified to confer upon it chemically reactive properties that are advantageous at the end of the life cycle of the polymer. This material is described and claimed in EP-B-0 946 597 (also U.S. Pat. No. 6,455,691) "Preparation of chemically reactive polysaccharides", the contents of which are incorporated into this specification by reference.

The PLA and the polysaccharide polymer are extruded together using a twin-screw extruder at 205° C. for 50 seconds to create the polymer blend in pellet form. This results in the PLA and the polysaccharide becoming thermally cross-linked.

The Surface-Treated $CaCO_3$ Powder

The surface-treated $CaCO_3$ powder contains fine powdered $CaCO_3$ particles that have been surface coated with a stearate compound. The majority of the particles have a size less than several µm and the stearate coat accounts for approximately 1% by weight.

The material used in this example is manufactured by Imerys Performance & Filtration Minerals and sold under the trade mark Polcarb 60S. In this material, approximately 60% of the particles have a size less than 2 µm and 1% of the particles have a size over 1 µm prior to coating. The coating accounts for 1.1±0.2% by weight.

The Mica

Mica clay is known for use as a mineral extender to increase barrier properties of tensile strength, moisture penetration and flexural modulus in fossil-fuel plastics. The main characteristics of mica are the natural flat platelets that were formed as the sedimentary clay was subjected to pressure and heat over thousands of years. The platelets do not interlink, rather they are randomly overlapping leaving irregular gaps.

To increase its barrier properties, mica is modified for use in the present embodiment. A fine particulate, high-aspect (as determined by sphericity model calculation) complimentary clay is used to fill in the gaps and fuse with the platelets. Kaolin clay is dried and mixed into dry mica then subjected to a temperature of 700° C. in a kiln to cause the kaolin to fuse with the mica and reduce the size of the random gaps between the platelets in mica.

This is done as follows:

Blend 91% mica with 9% kaolin by weight.

Spread the blend over a tray in the kiln.

Heat the mix at 700° C. for a minimum of 20 minutes.

Turn off the heat and allow the blend to reduce temperature gradually to 70° C.

The final blend is ready to be bagged into a suitable plastic bag and sealed for transportation.

In this embodiment, the mica used is sold as Mica MU101 manufactured by Imerys.

The Wood Flour

The wood flour is formed by sieving and grading wood flour to a size of 40 mesh to 120 mesh (sieve opening 0.42 mm to 0.125 mm).

Compounding the Material

The compounding of raw materials into pellets may be carried out using a twin-screw, vacuum-vented, wood-plastic (WPC) compounder. Standard plastic twin-screw compounders may not be able to form pellets of the present embodiment.

The inclusion of stearate compound coated $CaCO_3$ in an amount from 1 to 15% by weight, preferably 5 to 9% by weight of the mixture serves to protect the biopolymer from moisture degradation along the compression sectors of the compounder when the residual moisture of 5% contained in the wood flour is being vacuum vented along the screw length. The presence of the mica within the mixture reduces friction when the wood flour is blended with the polymer and reacts with the polymer to increase the flexural modulus above and reduce brittleness.

Table 3 sets forth the processing protocol within the compounder.

The zones referred to in the table are successive lengths of the compounder barrel through which the material passes, and the temperatures are those set in the programmer of the compounder prior to use.

TABLE 3

| | |
|---|---|
| Screw temperature | 128-160° C. |
| Zone 1 temperature | 180° C. |
| Zone 2 temperature | 191° C. |
| Zone 3 temperature | 190° C. |
| Zone 4 temperature | 195° C. |
| Adapter temperature | 196° C. |
| Screw speed | 25 rpm initially, rising to 100 rpm |
| Motor load | 45-47% |
| Mass pressure | 104 bar |
| Mass temperature | 183° C. |

Properties

The material of the present invention has improved temperature tolerance compared to when using other biopolymers, for example PLA alone. Indeed the material has been found to be useful at all temperatures between −32° C. and 150° C.

Degradation of the material of the invention can be initiated "on demand". That is, biodegradation can be started by application of an activator, for example liquid manure, to a product manufactured from the material at the end of its life. Fertilisers may be used to assist initiation of degradation.

When disposed of in compost, the degradation of the material occurs in two stages. First, the PLA actively biodegrades and disintegrates when exposed to moisture, heat and bacteria that is present in commercial composting. The effect of this stage of biodegradation causes many holes to appear in the material. Completion of biodegradation is achieved when liquid manure is added to the compost mulch.

Variations

The relative amounts of wood flour and polymer blend can be varied to control the properties of the material. It has been found that a useful minimum amount of the polymer blend is preferably 32% by weight, while the maximum for the wood flour is preferably 68% by weight.

By increasing the polymer blend and reducing the wood flour, more applications can be achieved that are currently outside the capabilities of existing biopolymers. Increasing the polymer content allows for more intricate mouldings to be made through smaller gates. The polymer wood compound is suitable for foaming with the following blowing agents: sodium bicarbonate or azodicarbonamide at a set concentration and variable rotational screw speed dependent on type of injection gates and hot runners. Embodiments can also be foamed by gas injection of carbon dioxide or nitrogen under reduced atmospheric pressure directly into the melt.

Application

Embodiments of the invention can be formed into products using various moulding techniques including injection moulding.

A principal use of materials of the invention is in the manufacture of disposable packaging, and disposable utensils. The material may also find application for the manufacture of durable goods, for instance in the motor industry.

Embodiments of the invention can also be used in the following applications:

horticultural devices and sapling tree protectors;
hot beverage cup disposable lids;
moulded panels for the automotive industry;
moulded knives forks and spoons, picnic ware;
moulded spectacle frames;
mobile phones and computer shells; and
golf club tags, hotel key cards, ball point pen barrels.

The above list is non-exclusive and it is expected that other uses will be found for embodiments of the invention.

End of Life

The material of the present invention is biodegradable. At the end of their lives, products made using the material of the invention can be disposed of in local authority recycling centres, commercial composting centres and incinerators.

The materials non-toxic to the atmosphere and will not contaminate the earth with heavy metal toxins or any other pollutants associated with fossil fuel materials and additives currently in use in the applications described above. The materials are likely to be relatively less harmful than conventional plastics when ingested by animals as the digestive juices and bacteria in the gut will disintegrate the material causing no harm.

IMERYS, INGEO, NATUREWORKS, POLCARB are registered trade marks.

The invention claimed is:

1. A material comprising a biopolymer blend including a crosslinked mixture of polylactic acid (PLA) and a starch, blended with particles of $CaCO_3$ that have been coated with a fatty acid compound; particles of mica; and a cellulose filler, wherein the starch has been treated to increase its chemical reactivity.

2. A material according to claim 1 in which the cellulose filler includes wood flour.

3. A material according to claim 1 in which the mica is mixed with kaolin clay.

4. A material according to claim 1 in which the polymer blend comprises at least 32% of the material by weight.

5. A material according to claim 1 in which the cellulose filler comprises at 68% of the material by weight.

6. A product that is formed from a material according to claim 1.

7. A product according to claim 6 that is a packaging product.

8. A product according to claim 6 that is a disposable food serving product.

9. A product according to claim 6 formed by injection moulding.

10. A method of producing a material comprising the steps of:
(a) forming a biopolymer blend from a mixture comprising polylactic acid (PLA) and a starch, wherein the starch has been treated to increase its chemical reactivity;
(b) admixing the biopolymer blend with particles of $CaCO_3$ that have been coated with a fatty acid compound, particles of mica, and a cellulose filler; and
(c) forming the mixture obtained following step (b) into a coherent mass.

11. A method of manufacturing a product, the method comprising the steps of:
(a) forming a biopolymer blend from a mixture comprising polylactic acid (PLA) and a starch, wherein the starch has been treated to increase its chemical reactivity;
(b) admixing the biopolymer blend with particles of $CaCO_3$ that have been coated with a fatty acid compound, particles of mica, and a cellulose filler;
(c) forming the mixture obtained following step (b) into a coherent mass; and
(d) forming the coherent mass into a product.

12. The method of claim 11, further comprising:
admixing the mixture obtained following step (b) with additional ingredients before forming the mixture at step (c).

13. A product produced by the method of claim 11.
14. The method of claim 10, further comprising:
admixing the mixture obtained following step (b) with additional ingredients before forming the mixture at step (c).

* * * * *